No. 795,421. PATENTED JULY 25, 1905.
L. SWARTS.
AGRICULTURAL IMPLEMENT.
APPLICATION FILED DEC. 17, 1904.
2 SHEETS—SHEET 2.
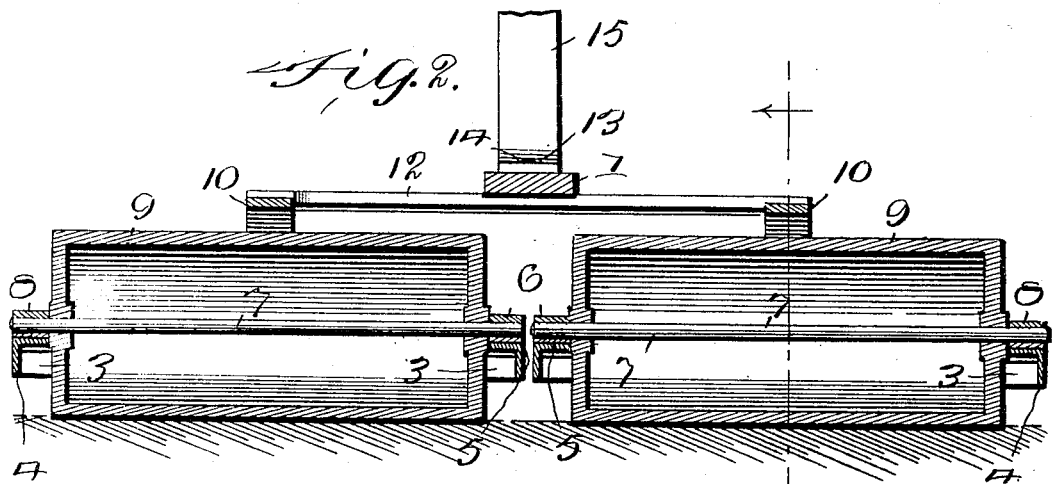
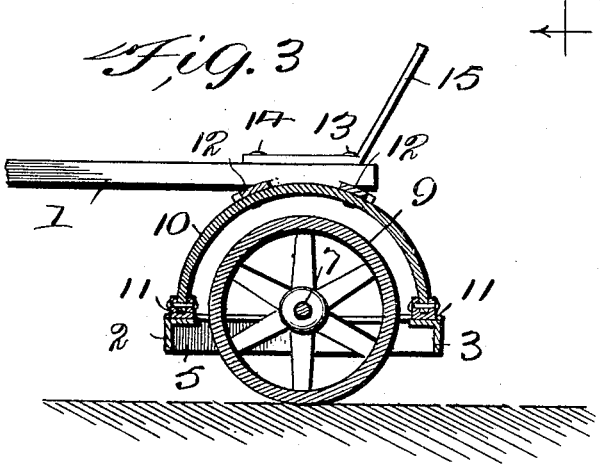
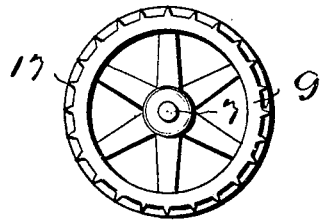
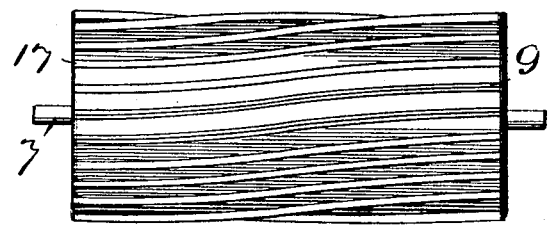
Inventor
Leroy Swarts

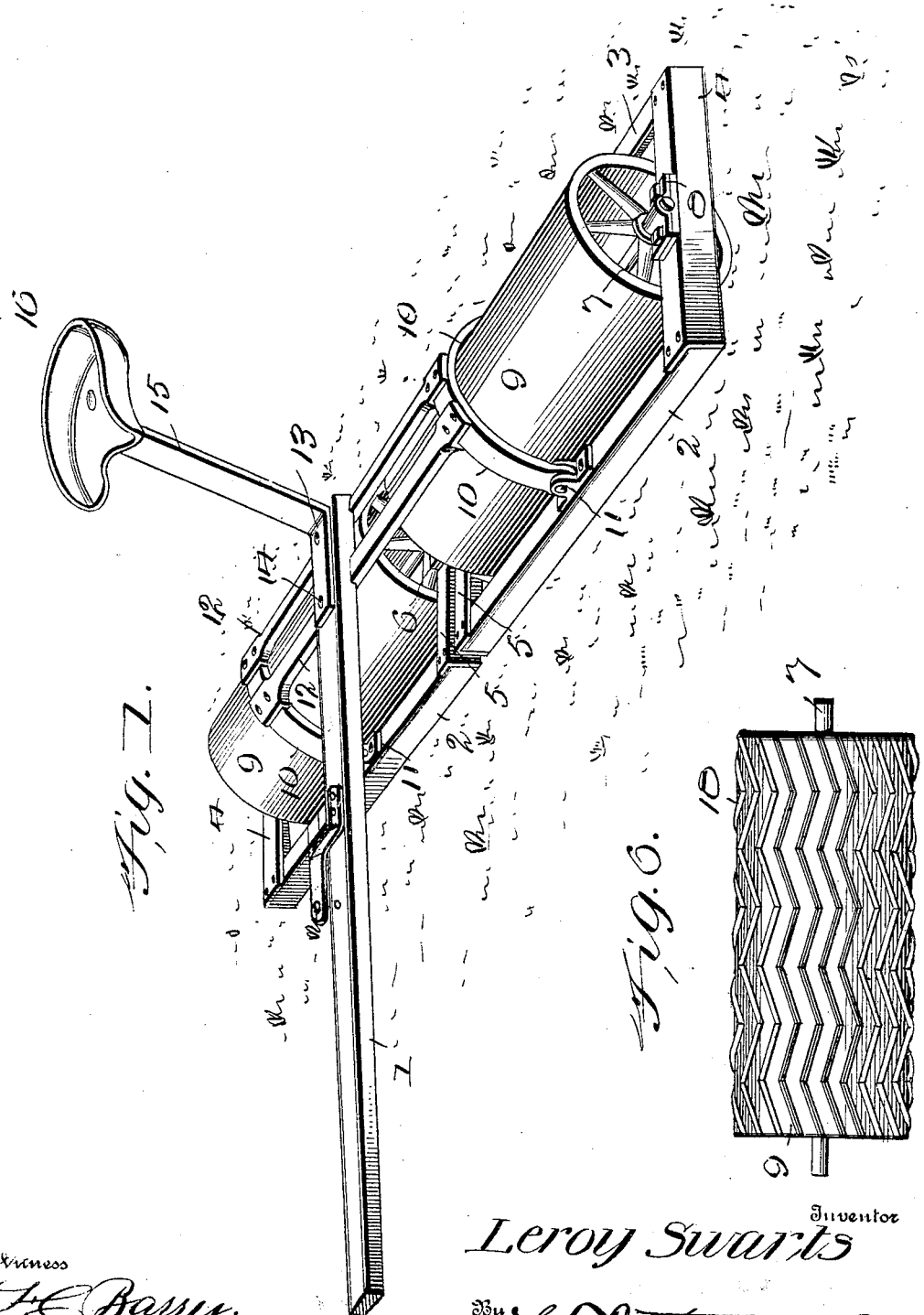

UNITED STATES PATENT OFFICE.

LEROY SWARTS, OF COLDWATER, OHIO.

AGRICULTURAL IMPLEMENT.

No. 795,421.  Specification of Letters Patent.  Patented July 25, 1905.

Application filed December 17, 1904. Serial No. 237,273.

*To all whom it may concern:*

Be it known that I, LEROY SWARTS, a citizen of the United States, residing at Coldwater, in the county of Mercer and State of Ohio, have invented certain new and useful Improvements in Agricultural Implements; and I do hereby declare the following to be a full, clear, and exact description of the invention, such as will enable others skilled in the art to which it appertains to make and use the same.

My invention relates to agricultural implements, and more particularly to land-rollers; and my invention consists of certain novel features of construction of parts, the preferred form whereof will be hereinafter clearly set forth, and pointed out in the claim.

The prime object of my invention, among others, is to provide a soil-pulverizing implement which will be found reliably efficient in preparing seed-beds of the most desirable character, whereby any variety of grain may be placed in the soil at a minimum expense of labor and with the assurance of early germination.

A further object is to provide a land-roller the parts of which or rollers proper will readily conform to the varying surfaces of the soil, and thus insure perfect work whether the surface be rough or level.

Other objects and advantages will be hereinafter made clearly apparent, reference being had to the accompanying drawings, which are considered a part of this application, and in which—

Figure 1 shows a perspective view of my invention complete ready for use. Fig. 2 is a central longitudinal section of my invention as shown in Fig. 1. Fig. 3 is a sectional view of Fig. 2 on line 3 3. Figs. 4 and 5 are respectively an end and side elevation of another form of roller-cylinder from that shown in Fig. 1. Fig. 6 presents another form of surface for the roller-cylinder, whereby more perfect pulverization of the soil will be attained.

For convenience of description the various parts of my invention and coöperating accessories will be designated by numerals, the same numeral applying to a similar part throughout the several views.

Referring to the drawings in detail, 1 designates the tongue by which the draft-animals are secured in the usual or any preferred manner, while 2 indicates the front sections of the framework, and 3 designates the rear sections thereof, said sections being preferably made of angle-iron, though other form of material may be used. The front and rear sections are connected together by means of the end sections 4, also made of any preferred material, while the inner ends of the sections 2 and 3 are connected by the middle members 5, the latter being designed to afford bearing-seats 6 for the inner ends of the shafts or journals 7, the outer ends of said shafts being provided with bearings 8 in the end sections 4, as clearly shown in Fig. 2.

The shafts 7, it will be observed, extend through the roller-sections 9. Each of said roller-sections, being independently mounted, is free to conform to the varying conditions of the surface of the ground, and in order that the frame-sections of each of the roller members 9 may be held in proper relationship to each other I provide a pair of yokes 10, which are substantially semicircular in form, being curved throughout their entire length and having their ends seated in bearings 11, said ends being connected pivotally to said bearings, thereby enabling the frame-sections and each of the roller members 9 to freely move in any position whereby the rollers will conform to the surface of the ground. By mounting the yokes with their ends within and resting upon the brackets 11 the pivot-pins are rendered free from all strain when the machine is in use, and there is not, therefore, any danger of said pins becoming broken or bent under the weight of the driver and the frame of the machine. It will also be observed by reference to Figs. 1 and 2 that the curved members or yokes 10 are rigidly connected together by the bars 12 and that the tongue 1 is also bolted to said members at their middle point, as designated by the numerals 13 and 14. The bolts 13 and 14 also hold the standard 15 in proper position to support the seat 16, whereby the driver may be accommodated so that he can ride while using my soil-pulverizer.

In Figs. 4, 5, and 6 I have shown the peripheral face of the rollers as being provided with longitudinally or obliquely directed ribs, the ribs in Figs. 4 and 5 being designated by the numeral 17 and extending from one end to the other of each of the rollers, it being understood that said rib-sections 17 shall be of sufficient extent to cut into the soil to sever roots, grasses, and the like, and thus assist in the disintegration of the coarser and tenacious portions of the soil.

In Fig. 6 it will be observed that the rib-sections 18 are staggered in form, one portion thereof running obliquely relative to the plane of the roller and then bent at an obtuse angle and extended a further portion along the surface of the roller and the bend again repeated, thus disposing the entire rib in a more or less zigzag condition and insuring that the soil will be thoroughly acted upon by said members and completely disintegrated and left in a pulverized condition, whereby a perfect seed-bed will be produced.

By the arrangement shown and described it will be seen that each of the rollers or members 9 is left free to conform to varying conditions of the soil and that either the inner or outer end of each roller may rise over the obstruction or drop into a depression, as the case may be, and believing that the construction and manner of using my invention have thus been made clearly apparent further description is deemed unnecessary.

While I have described the preferred combination and construction of parts, I desire to comprehend in this application all such substantial equivalents and substitutes falling fairly within the scope of my invention.

What I claim as new, and desire to secure by Letters Patent, is—

A machine of the character described comprising rollers, a frame for each roller, bearings centrally disposed upon opposite sides of each frame, a yoke upon each frame, the ends of said yoke extending downward and resting upon the bearings on its frame, means for pivotally connecting the yoke with its bearings, means for rigidly connecting the upper parts of the yokes, and a tongue fixedly secured to said connecting means.

In testimony whereof I have signed my name to this specification in the presence of two subscribing witnesses.

LEROY SWARTS.

Witnesses:
ALVA SMITH,
J. P. BIRKMEIER.